United States Patent [19]

Sato

[11] 4,326,659
[45] Apr. 27, 1982

[54] MAGNETIC RECORDING-REPRODUCING APPARATUS

[75] Inventor: Masaaki Sato, Hachioji, Japan

[73] Assignee: Olympus Optical Co., Ltd., Tokyo, Japan

[21] Appl. No.: 133,814

[22] Filed: Mar. 25, 1980

[30] Foreign Application Priority Data

Apr. 4, 1979 [JP] Japan .................................. 54-40492

[51] Int. Cl.³ ........................................... B65H 17/20
[52] U.S. Cl. .................... 226/190; 226/194; 271/208; 361/212
[58] Field of Search ............... 226/190, 194; 361/212, 361/214, 221; 271/208

[56] References Cited

U.S. PATENT DOCUMENTS

| 1,988,491 | 1/1935 | Hazell | 361/221 X |
| 2,353,462 | 7/1944 | Harkins | 361/221 X |
| 3,666,203 | 5/1972 | Sato et al. | 242/188 |
| 3,907,234 | 9/1975 | Sato et al. | 242/55.19 A |

Primary Examiner—Leonard D. Christian
Attorney, Agent, or Firm—Frishauf, Holtz, Goodman and Woodward

[57] ABSTRACT

A magnetic recording-reproducing apparatus is provided with a pinch roller made partly or wholly of an electrically conductive rubber, a pinch roller shaft made of an electrically conductive metal and a pinch roller bearing made of an electrically conductive metal. Electrostatic charge, if accumulated on a magnetic tape, will escape from the magnetic coating of the tape to the housing of the apparatus through the pinch roller, pinch roller shaft and pinch roller bearing—all electrically conductive.

4 Claims, 5 Drawing Figures

MAGNETIC RECORDING-REPRODUCING APPARATUS

BACKGROUND OF THE INVENTION

This invention relates to a tape recording-reproducing apparatus.

The magnetic tape used in magnetic recording-reproducing apparatus such as a video tape apparatus and an audio tape apparatus consists of a plastic film and a magnetic coating laid on the film. The magnetic tape, or more precisely its magnetic coating, may easily be electrified or charged. The tape, when electrified, will attract dust or will likely be attracted to a thing placed near it. If this happens, the tape is prevented from running as smoothly as desired. Dust, if stuck on the tape, will cause discharge noise which deteriorates the quality of the image or sound reproduced. The tape, if attracted to a thing, cannot be so smoothly taken up as to form a reel having smooth sides.

To avoid such an unwanted electrification, carbon black or graphite is coated on the plastic film of a magnetic tape or mixed with a binder in the magnetic coating, thereby to reduce the electric resistance of the magnetic coating. This, however, cannot fully prevent charging of electrification of a magnetic tape.

SUMMARY OF THE INVENTION

It is therefore an objcet of this invention to provide a magnetic tape recording-reproducing apparatus which can remove electrostatic charge from a magnetic tape to thereby prevent electrification of the magnetic tape.

To achieve the object, a magnetic recording-reproducing apparatus according to this invention is provided with a pinch roller made partly or wholly of an electrically conductive rubber, a pinch roller shaft made of an electrically conductive metal and a bearing made also of an electrically conductive metal for supporting the shaft. Electrostatic charge on a magnetic tape is made to escape from the magnetic coating to a housing of the apparatus through the pinch roller, the pinch roller shaft and the bearing—all electrically conductive.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Now referring to the accompanying drawing, a preferred embodiment of the invention will be described in detailed.

Figure 1:
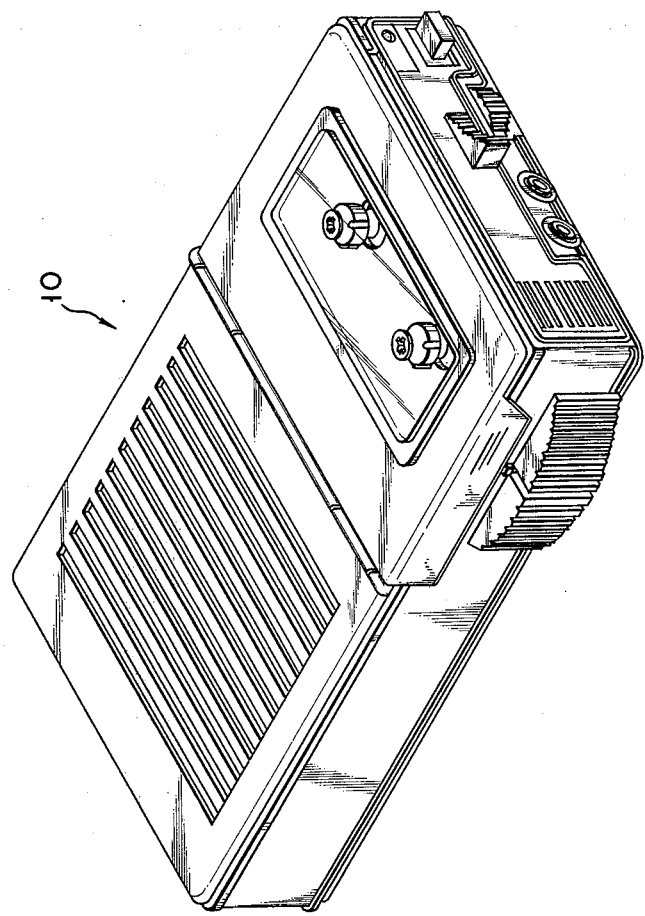
FIG. 1 is a perspective view of a cassette tape recorder embodying this invention.

This invention may be embodied in such a cassette tape recorder 10 as illustrated in FIG. 1. The invention may of course be embodied in other types of magnetic tape recording-reproducing apparatus, as will be evident from the following description.

Figure 2:
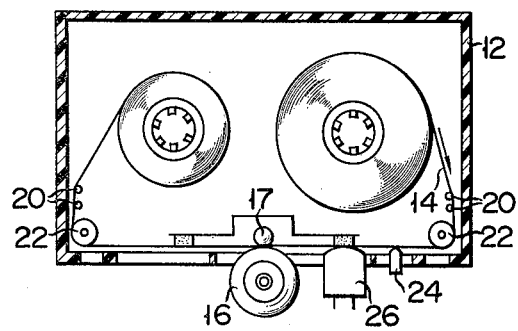
FIG. 2 is a longitudinal sectional view of a part of the apparatus shown in FIG. 1.

As shown in FIG. 2, the cassette tape recorder 10 is provided with a pinch roller 16 and a capstan 17 which cooperate to clamp and guide a magnetic tape 4 loaded in a tape cassette 12. The magnetic tape 14 may run, guided by guide pins 20 and guide rollers 22. As the tape 14 passes by them, an erase head 24 may erase signals from the tape 14 and a recording-reproducing head 26 records or reproduces signals on the tape 14.

Figure 3:
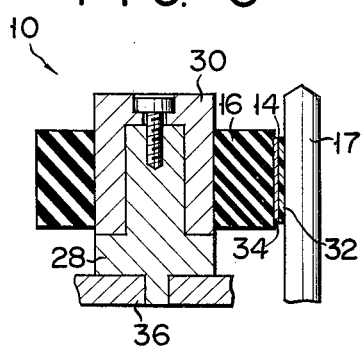
FIGS. 3, 4 and 5 are views partially in section which show various modifications of a pinch roller used in the apparatus shown in FIG. 1.

The pinch roller 16 is made of an electrically conductive rubber. As illustrated in FIG. 3, the roller 16 is attached to a shaft 30 made of an electrically conductive metal such as arbor. The shaft 30 is secured to a bearing 28 by means of a screw. The bearing 28 is made of an elctrically conductive metal such as oilless metal. Since the pinch roller 16 is made of an electrically conductive rubber, not a non-conductive rubber such as neoprene, electrostatic charge, if accumulated in the plastic film 32 or magnetic coating 34 of the magnetic tape 14, will escape or discharge to the housing of the cassette tape recorder 10 through the pinch roller 16, the shaft 30, the bearing 28 and a pinch roller lever 36. The tape 14 can therefore be fully prevented from being electrified and can thus run smoothly as desired and be taken up to form a reel having smooth sides.

Figure 4:
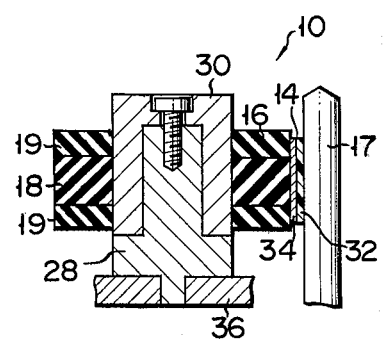
Figure 5:
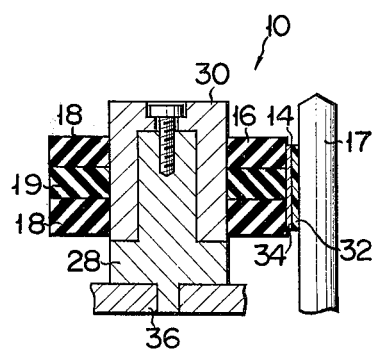

The pinch roller 16, however, has a smaller coefficient of friction than a pinch roller made of nonconductive rubber such as neoprene since it contains electrically conductive powder. For the same reason it is more likely to damage the magnetic tape. The roller 16 need not be made wholly of an electrically conductive rubber, as long as it can permit electrostatic charge to escape from the tape 14 to the housing of the tape recorder 10. More specifically, as shown in FIG. 4, the roller 16 may comprise an intermediate ring or section 18 made of a neoprene rubber and two end rings or section 19 made of an electrically conductive rubber and sandwiching the intermediate ring 18. Alternatively, as shown in FIG. 5, the roller 16 may comprise an intermediate ring 19 made of an electrically conductive rubber and two end rings 18 made of neoprene and sandwiching the intermediate ring 19. If constituted as shown in FIG. 4 or FIG. 5, the pinch roller 16 has a sufficiently large coefficient of friction and can cooperate with the capstan 17 to clamp the tape 14 firmly without damaging the tape 14.

As described above, according to this invention the pinch roller shaft and pinch roller bearing are made of electrically conductive metals, and further the pinch roller is made partly or wholly of an electrically conductive rubber. Electrostatic charge, if accumulated in the magnetic tape, can escape or discharge from the magnetic coating of the tape to the housing of a magnetic tape recording-reproducing apparatus through the pinch roller, the pinch roller shaft and the pinch roller bearing, whereby magnetic tape is prevented from being electrified.

What is claimed is:

1. A magnetic tape recording-reproducing apparatus comprising:

a housing at least a portion of which is electrically conducting;

a capstan mounted to said housing and which is rotatably driven to drive the magnetic tape;

a rotatable pinch roller shaft made of an electrically conductive metal;

a pinch roller bearing made of an electrically conductive metal for rotatably mounting said pinch roller shaft to said electrically conducting housing portion and for electrically connecting said pinch roller shaft to said electrically conducting housing portion; and a pinch roller of resilient material mounted on said pinch roller shaft and adapted to tightly contact a magnetic coating surface of a magnetic tape when the magnetic tape is pinched between the pinch roller and the capstan, at least a portion of the pinch roller which contacts the magnetic coating surface of the magnetic tape being made of a resilient electrically conductive rubber which has a substantial thickness in the radial direction of the pinch roller shaft and resiliently yielding when the pinch roller is pressed against the capstan with the magnetic tape therebetween, the electrically conductive rubber portion extending to and contacting the pinch roller shaft;

whereby electrostatic charge is conducted from the magnetic coating of the magnetic tape to the housing of the apparatus through the electrically conductive rubber portion of the pinch roller, the pinch roller shaft and the pinch roller bearing.

2. The magnetic tape recording-reproducing apparatus according to claim 1, wherein the pinch roller is divided into at least two sections along an imaginary plane which is perpendicular to the axis of the pinch roller shaft, at least one of the sections of the pinch roller being formed of said electrically conductive rubber.

3. The magnetic tape recording-reproducing apparatus according to claim 1, wherein the pinch roller is divided into three adjacent sections along two different spaced apart imaginary planes which are perpendicular to the axis of the pinch roller shaft, said sections comprising two end sections and an intermediate section, both of the end sections being formed of said electrically conductive rubber which contacts the pinch roller shaft, and said intermediate section being formed of a non-conductive rubber.

4. The magnetic tape recording-reproducing apparatus according to claim 1, wherein the pinch roller is divided into three sections along two different imaginary planes which are perpendicular to the axis of the pinch roller shaft, said sections comprising two end sections and an intermediate section, the intermediate section being formed of said electrically conductive rubber which contacts the pinch roller shaft, and said end sections both being formed of a non-conductive rubber.

* * * * *